(12) United States Patent
Wei

(10) Patent No.: US 7,618,352 B1
(45) Date of Patent: Nov. 17, 2009

(54) DRIVING MECHANISM FOR TREADMILL

(76) Inventor: Ta-Chuang Wei, No. 158, Chenhua Rd., Tali City, Taichung County (TW)

( * ) Notice: Subject to any disclaimer, the term of this patent is extended or adjusted under 35 U.S.C. 154(b) by 0 days.

(21) Appl. No.: 12/453,404

(22) Filed: May 11, 2009

(51) Int. Cl.
*A63B 22/02* (2006.01)
(52) U.S. Cl. .......................................... 482/54; 198/788
(58) Field of Classification Search ................... 482/51, 482/54; 198/780, 788, 789, 832, 835
See application file for complete search history.

(56) References Cited

U.S. PATENT DOCUMENTS

| | | | | |
|---|---|---|---|---|
| 2,915,167 A | * | 12/1959 | Berger | 198/788 |
| 5,088,596 A | * | 2/1992 | Agnoff | 198/788 |
| 5,413,209 A | * | 5/1995 | Werner | 198/500 |
| 5,509,872 A | * | 4/1996 | Chen | 482/54 |
| 6,443,295 B1 | * | 9/2002 | Hill | 198/788 |
| 6,672,449 B2 | * | 1/2004 | Nakamura et al. | 198/788 |
| 6,764,430 B1 | * | 7/2004 | Fencel | 482/54 |
| 7,299,915 B2 | * | 11/2007 | El-Ibiary | 198/788 |

\* cited by examiner

*Primary Examiner*—Loan H Thanh
*Assistant Examiner*—Tam Nguyen
(74) *Attorney, Agent, or Firm*—Rosenberg, Klein & Lee

(57) ABSTRACT

A driving mechanism used in a treadmill and concealed inside a tubular driving roller for rotating the tubular driving roller in moving an endless running belt through a driving gear of a transmission shaft, a reduction gear, a driven gear of a driven shaft and an internal gear.

1 Claim, 4 Drawing Sheets

DRIVING MECHANISM FOR TREADMILL

BACKGROUND OF THE INVENTION

1. Field of the Invention

The present invention relates to treadmills and more particularly, to a driving mechanism for treadmill, which has the motor and the related transmission parts set inside a tubular driving roller for rotating the tubular driving roller in moving an endless running belt.

2. Description of the Related Art

A conventional treadmill, as shown in FIG. 1, comprises a pair of rollers 11 mounted on a frame (not shown), an endless running belt 10 wound around the rollers 11 under a selected tension, a roller pulley 12 mounted on the shaft 110 of one roller 11 for receiving a drive belt 15, and a drive mechanism comprising a motor 13 having a drive pulley 14. The drive belt 15 is wound around the roller pulley 12 and the drive pulley 14 at a drive tension created by the selected tension in the running belt 10. This design of treadmill has drawbacks as follows:

1. Because the roller pulley 12, the motor 13, the drive pulley 14 and the drive belt 15 are disposed outside the endless running belt 10, they require much installation space.

2. The drive belt 15 may lose its tension after a long use, resulting in a driving error. In this case, the tension of the drive belt 15 must be corrected.

SUMMARY OF THE INVENTION

The present invention has been accomplished under the circumstances in view. It is one object of the present invention to provide a driving mechanism for treadmill, which has the motor and the related transmission parts set inside a tubular driving roller for rotating the tubular driving roller in moving an endless running belt, thereby saving much the installation space.

To achieve this and other objects of the present invention, a driving mechanism for treadmill comprises a tubular driving roller for rotating an endless running belt, a motor suspending inside the tubular driving roller, and a transmission system formed of a driving gear of a transmission shaft, a reduction gear, a driven gear of a driven shaft and an internal gear and concealed inside the tubular driving roller and movable by the motor to rotate the tubular driving roller.

DETAILED DESCRIPTION OF THE PREFERRED EMBODIMENT

Figure 1:
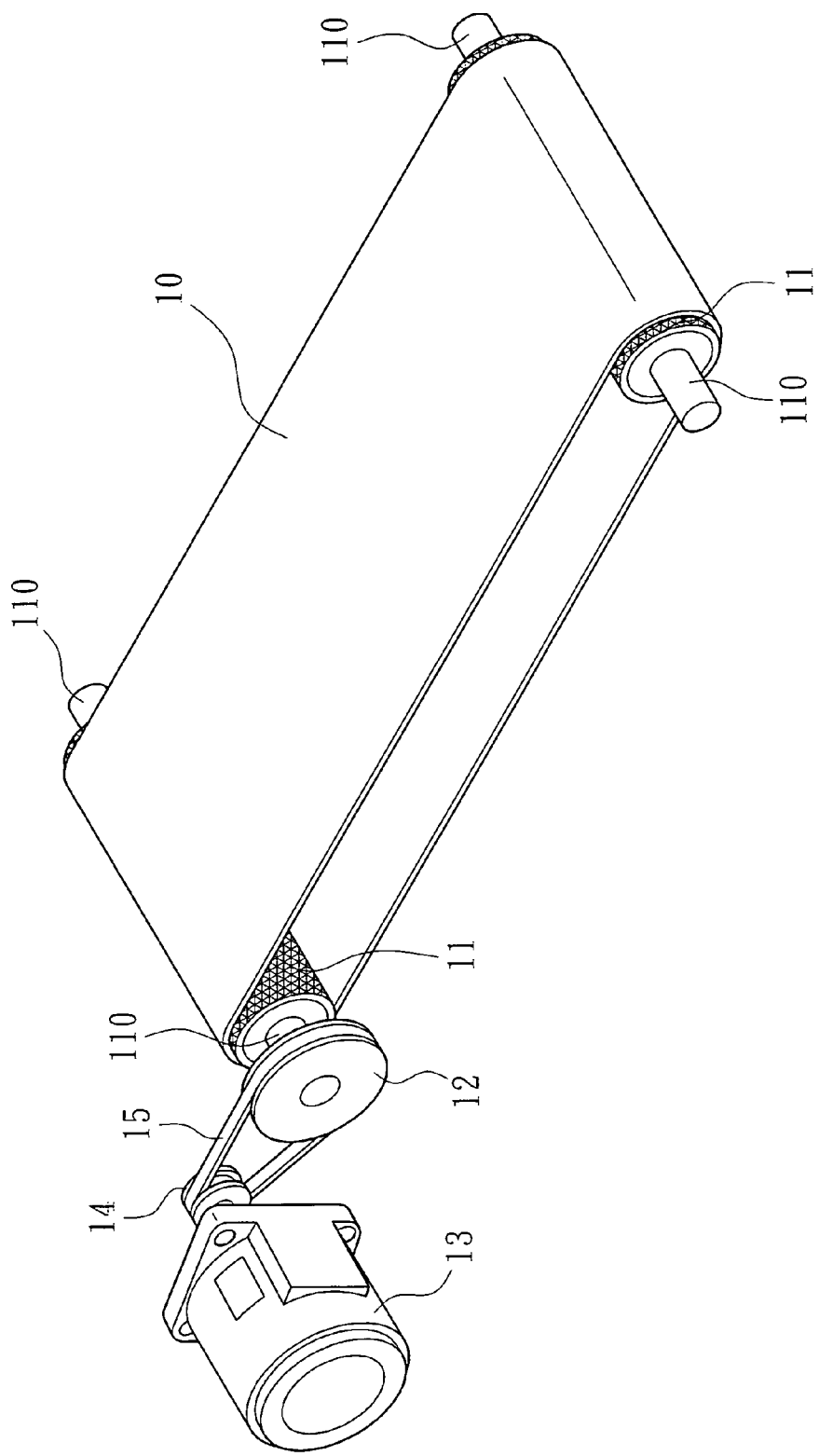
FIG. 1 illustrates the arrangement of a driving mechanism for treadmill according to the prior art.
Figure 2:
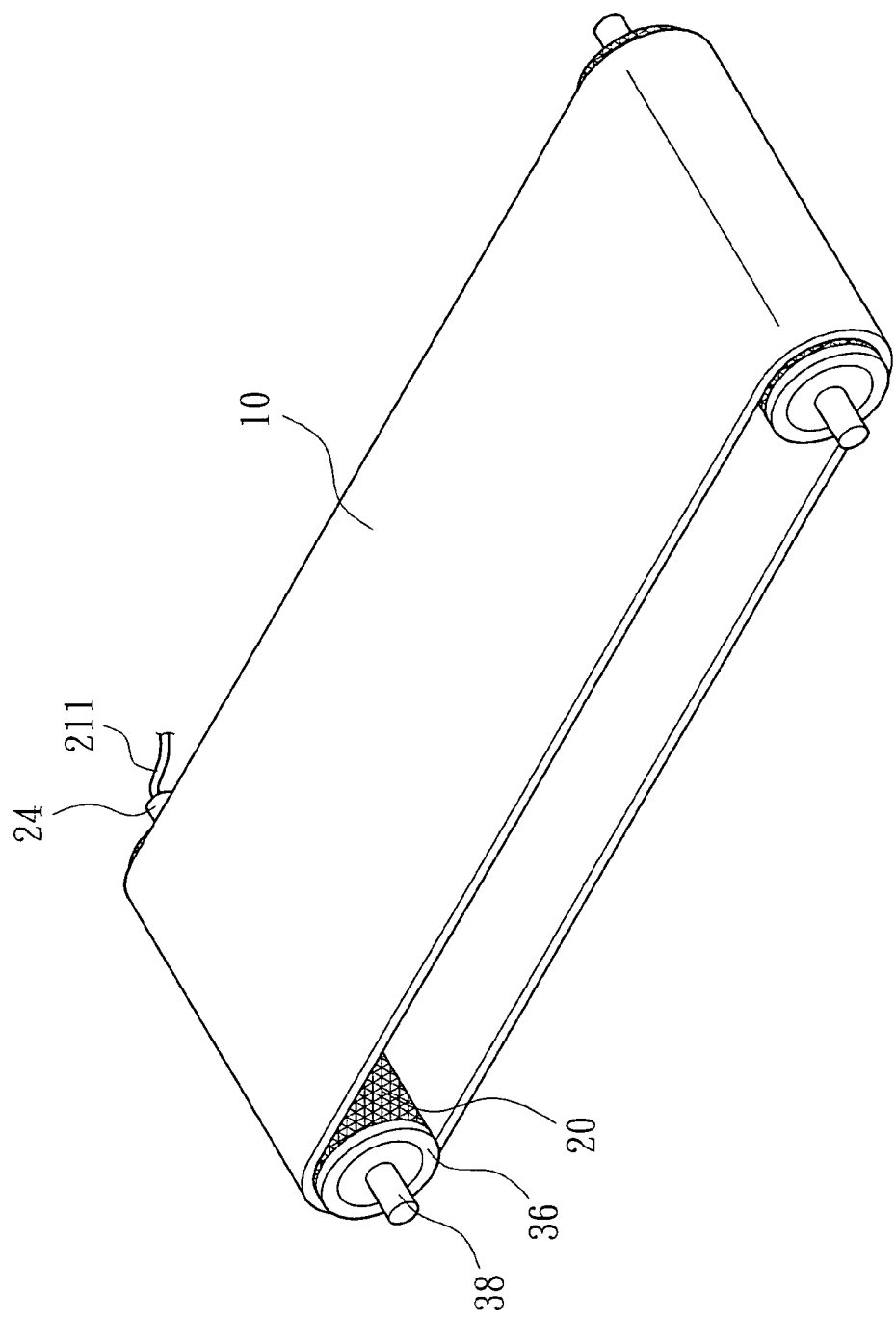
FIG. 2 illustrates the arrangement of a driving mechanism for treadmill according to the present invention.

Referring to FIGS. 2~5, a driving mechanism for treadmill in accordance with the present invention is shown comprising a tubular driving roller 20 adapted to rotate an endless running belt 10 (actually there is a driven roller arranged in parallel to the driving roller and mounted with the driving roller on a frame to support the endless running belt), a motor 21 suspending inside the tubular driving roller 20, a first hollow locating block 22 located on one side of the motor 21, a second hollow locating block 23 located on the other side of the motor 21, a first end cap 26 and a second end cap 25 respectively affixed to the two distal ends of the tubular driving roller 20 with pins 27, a connection tube 24, having one end fixedly connected to the first hollow locating block 22 and the other end pivotally connected the first end cap 26 with axle bearings 28, for guiding the power wire 211 of the motor 21 to the outside of the tubular driving roller 20, a transmission shaft 31 supported on axle bearings 30 in the second hollow locating block 23 and connected to the output shaft 210 of the motor 21 for synchronous rotation, a driving gear 310 fixedly mounted on the distal end of the transmission shaft 31 remote from the motor 21, a supplementary block 33 affixed to the second hollow locating block 23, a support block 32 affixed to the second hollow locating block 23, a driven shaft 34 supported on axle bearings 35 in the support block 32, a reduction gear 36 fixedly mounted on one end of the driven shaft 34 and meshed with the driving gear 310, an internal gear 39 mounted on the second end cap 25 inside the tubular driving roller 20, a driven gear 340 fixedly mounted on the other end of the driven shaft 34 and meshed with the internal gear 39, and a mounting rod 38 supported on axle bearings 37 in the second end cap 25 and connected to the support block 32 for mounting on a frame (not shown).

Figure 3:
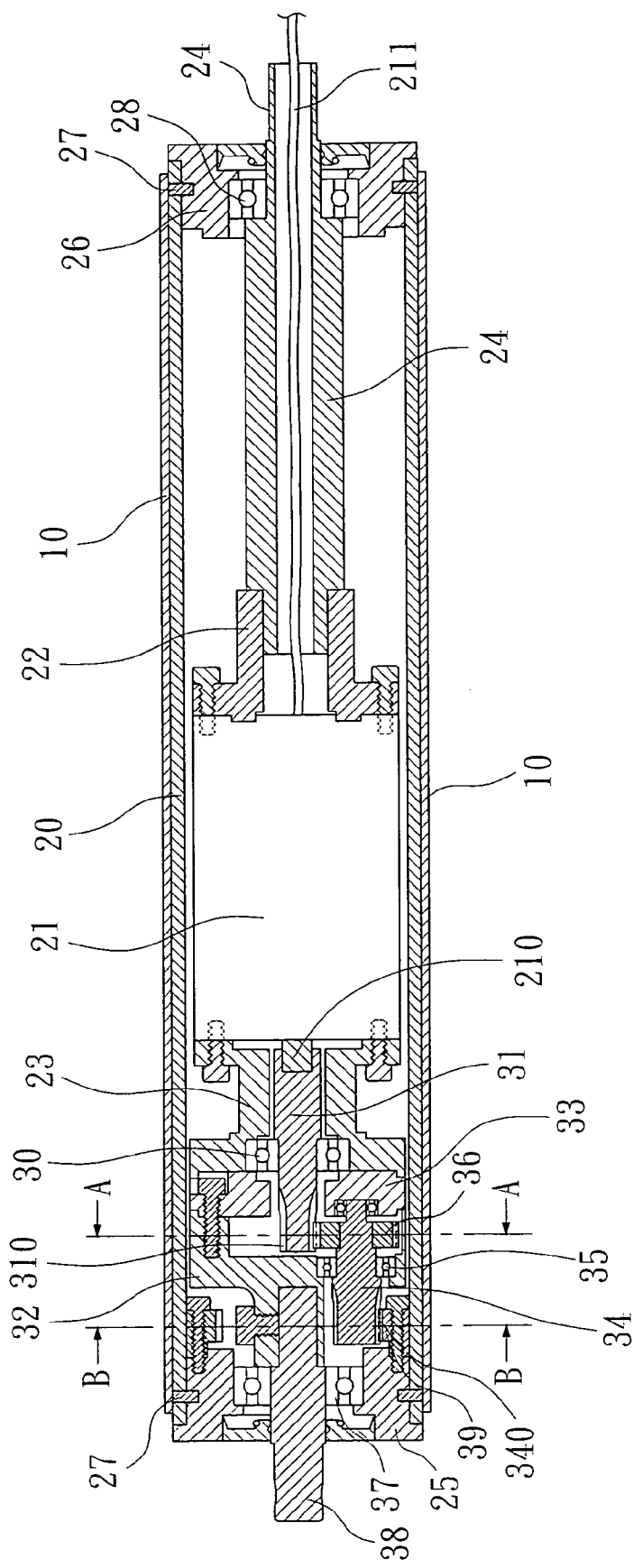
FIG. 3 is a sectional view of the driving mechanism for treadmill according to the present invention.
Figure 4:
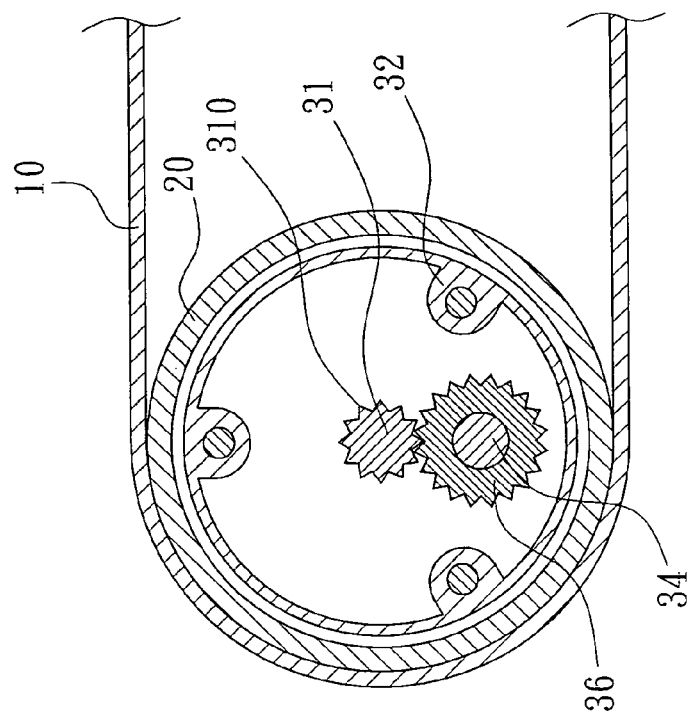
FIG. 4 is a sectional view taken along line A-A of FIG. 3.
Figure 5:
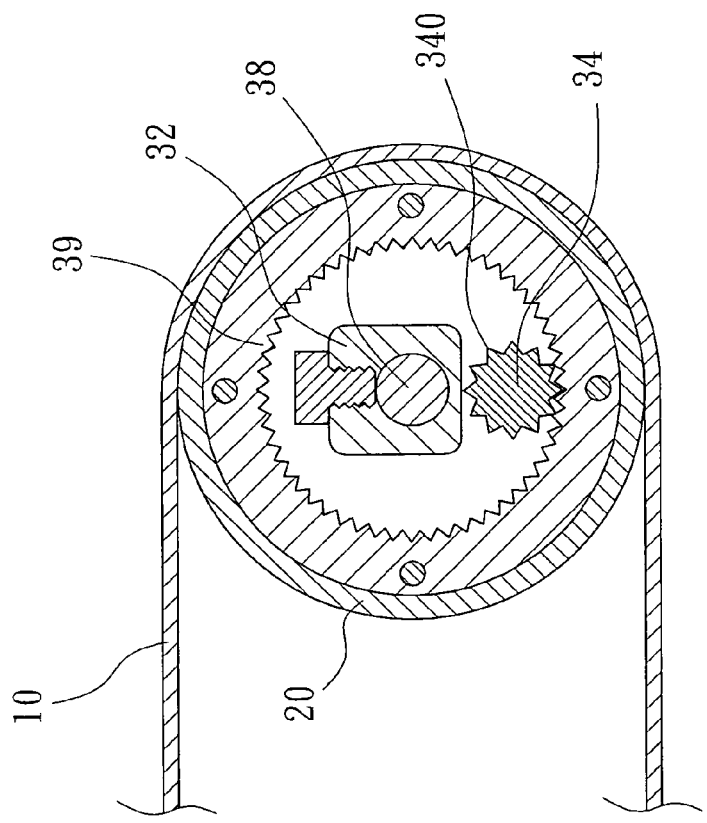
FIG. 5 is a sectional view taken along line B-B of FIG. 3.

Referring to FIGS. 3~5 again, when the motor 21 is started, the driving gear 310 is rotated with the transmission shaft 31 and the output shaft 210 of the motor 21 to rotate the reduction gear 36 and the driven shaft 34, thereby causing the internal gear 39 and the second end cap 25 to rotate, and therefore the tubular driving roller 20 is forced to rotate the endless running belt 10.

In conclusion, the driving mechanism for treadmill in accordance with the present invention has the advantages:

(1) The motor 21 and the related parts of the driving mechanism are concealed inside the tubular driving roller 20, saving much installation space.

(2) There is no driving belt provided between the motor 21 and the tubular driving roller 20, avoiding belt tension adjustment problem. By means of transmission of rotary driving power from the motor 21 to the tubular driving roller 20 through the driving gear 310 of the transmission shaft 31, the reduction gear 36, the driven gear 340 of the driven shaft 34 and the internal gear 39, the performance is accurate and highly stable.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A driving mechanism for a treadmill, comprising a tubular driving roller adapted to rotate an endless running belt, a motor suspending inside said tubular driving roller, a first hollow locating block located on one side of said motor, a second hollow locating block located on an opposite side of said motor, a first end cap and a second end cap respectively affixed to two distal ends of said tubular driving roller with pins, a connection tube, having a first end fixedly connected to said first hollow locating block and a second end pivotally connected to said first end cap with axle bearings, for guiding a power wire of said motor to the outside of said tubular driving roller, a transmission shaft supported on axle bearings in said second hollow locating block and connected to an output shaft of said motor for synchronous rotation thereof, a driving gear fixedly mounted on an end of said transmission shaft remote from said motor, a supplementary block affixed to said second hollow locating block, a support block affixed to said second hollow locating block, a driven shaft supported on axle bearings in said support block, a reduction gear fixedly mounted on one end of said driven shaft and meshed with said driving gear, an internal gear mounted on said second end cap inside said tubular driving roller, a driven gear fixedly mounted on an opposite end of said driven shaft and meshed with said internal gear, and a mounting rod supported on axle bearings in said second end cap and connected to said support block for mounting on a frame; wherein when said motor is started, said driving gear is rotated with said transmission shaft and said output shaft of said motor to rotate said reduction gear and said driven shaft, thereby causing said internal gear and said second end cap to rotate, and therefore said tubular driving roller is forced to rotate said endless running belt.

* * * * *